United States Patent
Ros

(10) Patent No.: US 8,457,890 B2
(45) Date of Patent: Jun. 4, 2013

(54) METHOD FOR GENERATING A DIGITAL ROAD MAP, NAVIGATION SYSTEM AND METHOD FOR OPERATING A NAVIGATION SYSTEM

(75) Inventor: Feliu Ros, Würzburg (DE)

(73) Assignee: Garmin Würzburg GmbH (DE)

( * ) Notice: Subject to any disclaimer, the term of this patent is extended or adjusted under 35 U.S.C. 154(b) by 586 days.

(21) Appl. No.: 12/703,433

(22) Filed: Feb. 10, 2010

(65) Prior Publication Data

US 2010/0204912 A1 Aug. 12, 2010

(30) Foreign Application Priority Data

Feb. 10, 2009 (DE) .......................... 10 2009 008 316
May 4, 2009 (DE) .......................... 10 2009 019 498

(51) Int. Cl.
*G01C 21/10* (2006.01)

(52) U.S. Cl.
USPC ....... 701/489; 701/409; 340/990; 340/995.19

(58) Field of Classification Search
USPC ................. 701/489, 532, 431, 437, 409, 416, 701/468, 45, 428, 410, 41; 340/990, 995.19, 340/995.2, 995.1, 995.14
See application file for complete search history.

(56) References Cited

U.S. PATENT DOCUMENTS

| | | | |
|---|---|---|---|
| 5,612,881 A | 3/1997 | Moroto et al. | |
| 6,556,917 B1 | 4/2003 | Wawra et al. | |
| 6,622,085 B1 | 9/2003 | Amita et al. | |
| 6,650,999 B1 | 11/2003 | Brust et al. | |
| 6,674,434 B1 | 1/2004 | Chojnacki et al. | |
| 6,704,648 B1 * | 3/2004 | Naik et al. ..................... | 701/532 |
| 7,283,905 B1 | 10/2007 | Beesley et al. | |
| 2002/0082025 A1 | 6/2002 | Baese et al. | |
| 2003/0011676 A1 | 1/2003 | Hunter et al. | |
| 2003/0154023 A1 | 8/2003 | Utsumi | |
| 2005/0190076 A1 | 9/2005 | Howard et al. | |
| 2006/0020387 A1 | 1/2006 | Nagata et al. | |
| 2006/0092002 A1 | 5/2006 | Finkelstein | |
| 2006/0111835 A1 | 5/2006 | Baker et al. | |
| 2006/0155465 A1 | 7/2006 | Jung et al. | |
| 2007/0027625 A1 | 2/2007 | Kamdar et al. | |
| 2007/0226243 A1 | 9/2007 | Fuki et al. | |
| 2008/0046178 A1 | 2/2008 | Tava et al. | |

FOREIGN PATENT DOCUMENTS

| | | |
|---|---|---|
| DE | 19547574 A1 | 10/1996 |
| DE | 19923750 A1 | 11/1999 |
| DE | 19938951 A1 | 3/2001 |
| DE | 19941477 A1 | 3/2001 |
| DE | 10051406 A1 | 5/2002 |

(Continued)

*Primary Examiner* — Thomas Black
*Assistant Examiner* — Luke Huynh
(74) *Attorney, Agent, or Firm* — Samuel M. Korte; Mohammad M. Ali

(57) ABSTRACT

The present invention pertains to a method for generating a digital roadmap that can be stored on an electronic storage medium and in which a geographical area is specified by a multitude of data sets. The present invention further pertains to a navigation system that features a memory on which a digital roadmap of this type is stored and provided for use. Moreover, the present invention pertains to a method for operating a navigation system of the afore-mentioned type with a digital roadmap of the afore-mentioned type.

17 Claims, 6 Drawing Sheets

FOREIGN PATENT DOCUMENTS

| | | | |
|---|---|---|---|
| DE | 10307591 | A1 | 9/2003 |
| DE | 102004043177 | A1 | 11/2005 |
| DE | 102005004332 | A1 | 8/2006 |
| DE | 102006038676 | A1 | 8/2008 |
| EP | 0645603 | A1 | 3/1993 |
| EP | 0702208 | A2 | 3/1996 |
| EP | 1172631 | A1 | 1/2002 |
| EP | 1191500 | A1 | 3/2002 |
| EP | 1234735 | A1 | 8/2002 |
| EP | 1471329 | A2 | 10/2004 |
| EP | 1600912 | A1 | 11/2005 |
| EP | 1605419 | A1 | 12/2005 |
| EP | 1653196 | A | 5/2006 |
| EP | 1818892 | A1 | 8/2007 |
| JP | 2003232648 | A | 8/2003 |
| WO | 0034933 | A1 | 6/2000 |
| WO | 2004076978 | A1 | 9/2004 |

\* cited by examiner

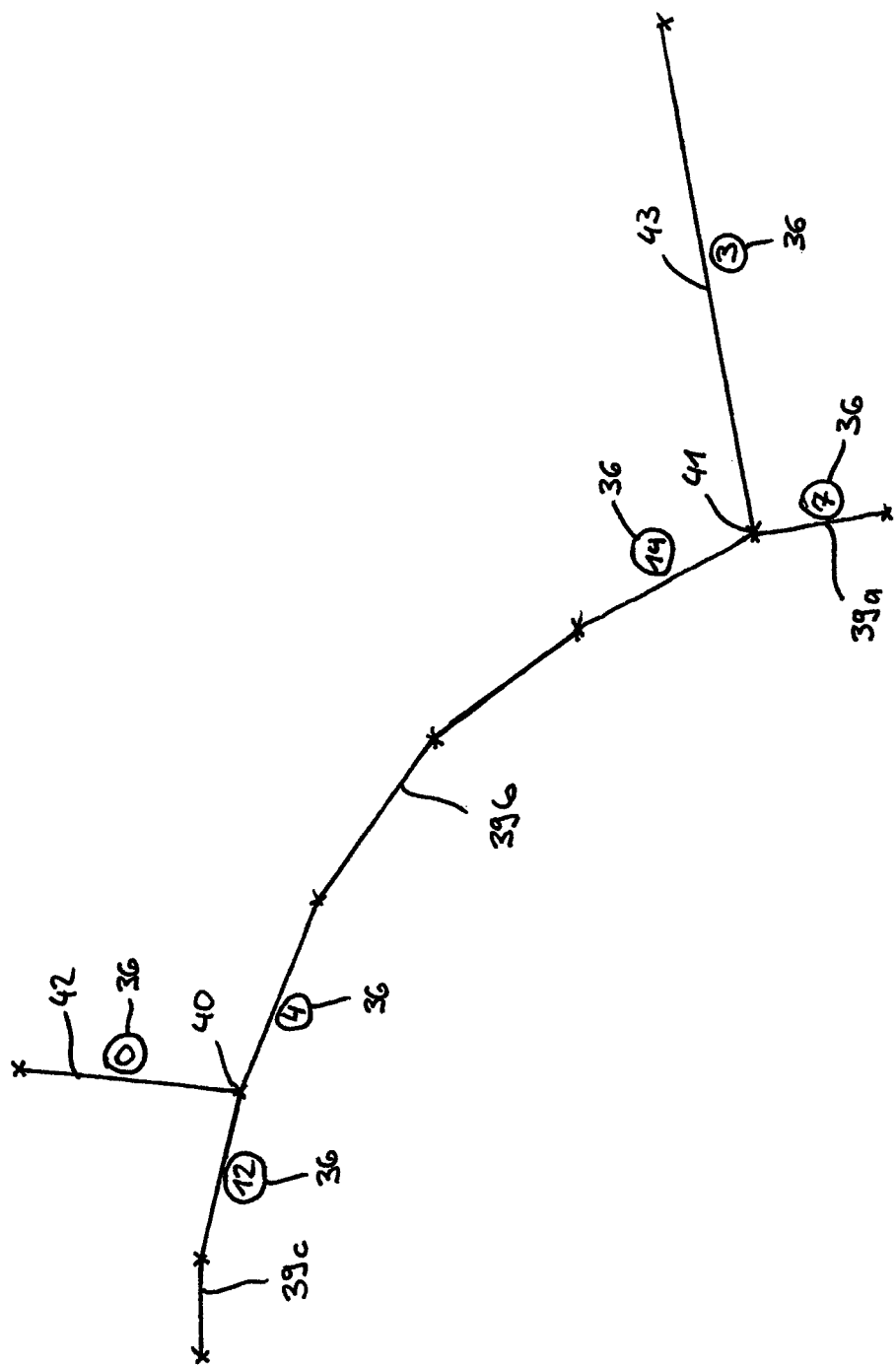

METHOD FOR GENERATING A DIGITAL ROAD MAP, NAVIGATION SYSTEM AND METHOD FOR OPERATING A NAVIGATION SYSTEM

BACKGROUND OF THE INVENTION

The present invention pertains to a method for generating a digital roadmap that can be stored on an electronic storage medium and in which a geographical area is specified by a multitude of data sets. Besides, the present invention pertains to a navigation system that features a memory on which a digital roadmap of this type is stored and provided for use. Moreover, the present invention pertains to a method for operating a navigation system of the afore-mentioned type with a digital roadmap of the afore-mentioned type.

The core function of known navigation systems is based on the computation of routes from a starting point to a destination. Said computation thereby fundamentally relies on databases, in which the traffic routes of a specific geographical area are specified by means of a network of nodes and road elements linking said nodes. Besides, the road elements as such are specified in the database by means of road data sets in which a corresponding number of n reference points are stored. The position of the reference points thereby assumes the shape of the course of the respective road element. Each road data set is thereby required to contain at least two reference points (n=2), since each road element is required to feature at least one initial reference point and one final reference point.

Known route computation methods rely on a wave-like iterative procedure based on the starting point. The basic principle of said iterative procedures resides in the aspect that route costs are respectively computed for the various route alternatives in order to be able to evaluate the various route alternatives with respect to a specific value parameter, for instance the shortest route or the shortest time of travel. By means of the route cost computation the characteristic parameters in respect of which the route is supposed to be optimized are hence evaluated. The iterative methods for computing the route can thereby be initiated at the starting point or at the destination such that as a consequence, the search direction is irrelevant.

The problem to be solved according to the present invention is in literature referred to as the "Manhattan problem". This problem results from the aspect that in conventional iteration methods for computing a route with respect to the shortest possible distance or with respect to the shortest possible time of travel, in case of cities featuring a road network with a clear-cut check pattern, routes that very frequently require alternating left and right turning maneuvers along the route are often the resultant output. This phenomenon, referred to as "zigzag routing", is in principle undesirable, since the driver is required to execute a very large number of maneuvers along the predetermined route, even though, without entailing any significant drawbacks, another route along which a much smaller number of maneuvers would be sufficient could be traveled as well.

In order to eliminate said undesired zigzag routing, there are known navigation methods in which, in the route computation, a maneuver evaluation is performed for each maneuver executed at a node between at least two road elements. As a result of said maneuver evaluation, a maneuver cost value is subsequently computed for the corresponding maneuver and is incorporated into the route computation. Route alternatives with an overall lower maneuver cost value that results from the sum of all individual maneuver cost values are subsequently prioritized over route alternatives with an overall higher maneuver cost value.

For computing the maneuver cost values, various approaches are known from the state of the art. In line with a first problem-solution approach, intersection tables are stored in the database for specifying the road network in the relevant area. Said intersection tables hence contain the corresponding intermediate angles or a maneuver cost value derived therefrom for each combination of two road elements positioned at a node. In computing the individual route alternatives, said corresponding maneuver cost values are subsequently read out from the intersection tables and are taken into consideration in the evaluation of the individual route alternatives. Said intersection tables are afflicted with the drawback that the databases for storing the road network become heavily bloated. In addition, considerable computing capacity is required for the evaluation of the intersection tables so that the required hardware is either extremely expensive or else, the corresponding route computation methods are significantly slowed down.

Alternatively to storing intersection tables, it is likewise known that the intersection geometry in the individual nodes is analyzed during the computation of the individual route alternatives by evaluating the geometry of the route trajectories and that the respective angles between two road elements are derived therefrom. This problem-solution approach does in fact provide advantages with respect to the database size, since no additional data are required to be stored. However, the evaluation of the geometry of the route trajectories at the intersection points is very complex so that the computation speed for the route alternatives is undesirably long.

BRIEF SUMMARY OF THE INVENTION

Proceeding from this prior art, it is an objective of the present invention to propose a method for generating a modified digital roadmap, wherein by using said modified digital roadmap that is stored in a resultant database, a very rapid and simple maneuver cost evaluation can be performed without an undesirable bloating of the database. In addition, it is an objective of the present invention to propose a navigation system that is equipped with a corresponding modified digital roadmap.

These objectives are attained by the methods and the navigation system according to the teaching of the independent main claims.

Advantageous embodiments of the present invention are the subject-matter of the subordinate claims.

The fundamental principle of the present invention can be seen in a novel method for generating a modified digital roadmap in which the road network of a geographical area is specified. For this purpose, an original database containing a multitude of data sets for specifying the road network is initially loaded into an analyzing device. The original database thereby conventionally specifies the road network as a network of nodes and road elements linking said nodes. It is a characteristic feature of the original database that the individual road elements are specified by road data sets, wherein each road data set is representative of one sequence of n reference points that are appropriate for defining the shape of the course of the road.

Subsequently, a road data set is initially selected from the original database and a road start angle and a road end angle are computed for said road data set. The road start angle thereby specifies the angle exhibited by the road between the first and the second reference point of the road element relative to a reference direction. The road end angle, by contrast, specifies the angle at which the road extends between the penultimate and the ultimate reference point of the road element relative to the reference direction. After having ascertained the road start angle and the road end angle for the road element to be respectively analyzed, said two values are stored in a modified resultant database as additional data in addition to the road element. The computation of the road start angle and the road end angle is thereby performed for a multitude of road data sets so that the modified resultant database in contrast to the original database is characterized by the aspect that the road data sets respectively contain the road start angle and the road end angle as additional pieces of information. By means of said additional pieces of information, maneuver evaluations for computing a maneuver cost value can be performed in a very simple fashion by using said modified resultant database in the route computation, wherein the volume of the resultant database is only slightly increased compared to the original database, since the road start angle and the road end angle can be stored in a very compact fashion if appropriately encoded. In other words, this means that the respective angles are not necessarily required to be stored in the resultant database as precise numerical values, but suitable angle values can likewise be derived from the previously computed road start angles and the road end angles, wherein only the derived angle values for representing the road start angle and the road end angle are subsequently stored in the resultant database.

The reference direction relative to which the road start angle and the road end angle are determined is generally optional. According to a preferred method alternative, the two angles are respectively determined relative to a northward direction.

Concerning the basic alternative of the inventive method, it is in principle sufficient that the road start angle and the road end angle are respectively only stored as an absolute value. However, it is particularly advantageous if the resultant database also contains information on the orientation of the road start angle and the road end angle such that as a function of the respective direction of travel, it can be ascertained for a maneuver if a right-turn maneuver or a left-turn maneuver is concerned, since, depending on the aspect of whether a country adheres to left-hand traffic or right-hand traffic rules, left-turn maneuvers and right-turn maneuvers respectively cause different maneuver costs. In countries that adhere to right-hand traffic rules, right-turn maneuvers can in fact be executed in a much easier and much more rapid fashion in contrast to left-turn maneuvers in which the oncoming traffic needs to be crossed. In order to be able to readily distinguish said left-turn maneuvers and right-turn maneuvers, the resultant database should contain corresponding information on the orientation of the two angles.

In order to simplify indicating the orientation of the road start angle and the road end angle, the orientation should respectively be uniformly ascertained and stored in a clockwise direction and in an anti-clockwise direction.

In order to enable obtaining information on the orientation of the two angles in a simple fashion, the road start vector may extend from the first reference point of the road element to the second reference point of the road element in the direction of travel, and the road end vector may extend from the penultimate reference point of the road element to the ultimate reference point of the road element respectively in the direction of travel. The two reference direction values are at the same time ascertained by the first reference point in the direction of travel and the penultimate reference point of the road element in the direction of travel, resulting in a uniform configuration for indicating the orientation of the road start angle and the road end angle.

As already described above, it is particularly advantageous to encode the road start angle and the road end angle when storing the same in the resultant database by means of appropriate angular values in order to confine the increase in volume of the database, caused by the additional storing of information, to the lowest possible degree. In said encoding of the road start angle and the road end angle into the relevant derived angular values, it is thereby especially advantageous if the two angular values respectively exhibit a data size of 4 bit and can thusly by jointly stored in one data byte. In this way, by means of the inventive method for generating a modified digital roadmap, the resultant database is enlarged by one byte for each road data set.

The road start angle and the road end angle can be encoded into angular values derived therefrom in a particularly simple fashion if, to this end, the value range of 360° that corresponds to a full circle enclosing the reference vector is divided into several, in particular 16, equi-sized sectors. Thereby, each of said sectors is assigned a sectoral value that correlates with the sector and that characterizes the angular range contained in the sector. In encoding the road start angle and the road end angle, the sector in which the road start angle and the road end angle are respectively contained is subsequently ascertained and the sectoral value is stored in the resultant database as a derived parameter. By means of this simplification, the value range of 360° can for instance be illustrated on 16 sectoral values, wherein each sector is representative of a value range with an intermediate angle of 22.5°.

If the intermediate angle is precisely 22.5°, which corresponds to a total number of 16 sectors, the angular value derived from the road start angle and the road end angle can respectively be stored in the resultant database with a data size of 4 bit, resulting in that each road data set is increased in data volume by 1 byte. The sectoral values for characterizing the individual sectors can be generated in a particularly simple fashion as a result of the aspect that, for this purpose, a sector division angle is used that precisely corresponds to the respective intermediate angle of the sector. When dividing the previously computed numerical value of the road end angle and the road start angle by said sector division angle, the integer remainder of said division result can be perfectly used as a sectoral value for the individual sectors.

The inventive navigation system, which can for instance be a mobile or a permanently integrated navigation device, is characterized by the feature that it operates with a memory on which the digital roadmap for specifying the road network is stored as a modified resultant database that has been generated according to the inventive method. In other words, this means that the navigation system is characterized by the feature that the digital roadmap used for the route computation contains the road end angle and the road start angle as additional pieces of information for preferably each road data set. The memory with the modified resultant database can thereby be permanently integrated in the navigation system. As an alternative thereto, it is also conceivable that the memory is not locally disposed at the navigation device, but that for instance the digital roadmap containing the additional pieces of information is stored on a data server, wherein said data are transmitted via a long-distance data transmission line, for instance a mobile communication line or an internet data transmission line. The inventive route computation method employs an inventive navigation system that, in the memory thereof, contains a digital roadmap with the additional pieces of information on the road start angle and the road end angle of the road elements. In the maneuver cost evaluation to be performed for each maneuver along a route at an intersection point, the road end angle or the angular value derived therefrom for the road element preceding the intersection point and the road start angle or the angular value derived therefrom for the road element succeeding the intersection point are subsequently read out from the database and are loaded into a route computation unit. In the route computation unit, the angular difference between the road start angle and the road end angle or an angular differential value between the two angular values derived from the road start angle and the road end angle are subsequently computed, and from said angular differential value a maneuver cost value is in turn derived. In other words, this means that in the inventive maneuver cost evaluation, the maneuver cost value is derived exclusively as a function of the angular difference between the road start angle and the road end angle of the two road elements that lie adjacent to one another at an intersection point of a maneuver such that the corresponding computation method can be performed in a very rapid fashion and on the basis of relatively low hardware requirements.

With respect to the fastest possible feasibility of the inventive method, it is particularly advantageous if, in the computation of the maneuver cost value, the angular differential value is respectively compared with one or several predefined angular differential threshold values. Subsequently, the maneuver cost value for the respective maneuver is only increased if the angular differential value exceeds the corresponding angular differential threshold value. If the angular difference, by contrast, lies below the corresponding threshold value, the maneuver cost value remains unchanged. By means of this gradation of the maneuver cost evaluation, the scope of the computation operation to be performed can be significantly reduced. According to a preferred method alternative of the maneuver evaluation, provision is made for that the road class of the road elements converging into an intersection point is ascertained as an additional piece of information. The inventive maneuver cost evaluation can subsequently be terminated if at least one thusly ascertained road class exceeds or lies below a predefined road class threshold value. By way of said method alternative, it is possible to omit the inventive maneuver cost evaluation in any such instances where roads of higher road classes, namely in particular freeways and highways, are involved in a maneuver, since for said roads of higher road classes it is highly unlikely that the road network exhibits a clear-cut grid structure. The inventive maneuver cost evaluation provides an advantage primarily precisely for any such road networks and road network areas with a clear-cut grid structure as a function of the angular differential value. By terminating said maneuver cost evaluation as a function of the road class value of the respectively involved road elements, unnecessary computation steps can be omitted, since for instance in case of freeways and highways, no advantage is to be expected as a result of the inventive maneuver cost evaluation.

In terms of reducing the computation time, it is equally advantageous if the number of the road elements that converge at an intersection point is computed and taken into consideration. In this way, the maneuver cost evaluation can be terminated in any such instances where precisely two road elements converge at an intersection point, since even in the presence of an angular differential value at said transitional area between the two road elements, this merely means that a curve is contained in said area, wherein the driver is not provided with any driving alternatives whatsoever so that by evaluating the angular difference, no improvement of the route computation can be expected.

By contrast, it is particularly advantageous if the turning direction of the maneuver is respectively derived from the angular differential value and if the maneuver cost evaluation is performed as a function of the turning direction. In this way, it is possible to assign respectively different maneuver cost evaluations for right-turn maneuvers and for left-turn maneuvers in countries that adhere to left-hand traffic rules and in countries that adhere to right-hand traffic rules, since, as a function of the respective turning direction, respectively different maneuver costs are caused.

Besides, by means of the inventive evaluation of the angular difference, it is possible to recognize angle-based right-of-way situations when additionally evaluating a supplementary attribute of the road elements and to incorporate the same into the maneuver cost evaluation. Thus, in particular priority-to-right driving situations can be recognized and can be taken into consideration with respect to the respectively caused maneuver costs.

According to another development, the road start angle of a road element, in particular the road start angle of the destination road, can also be used for determining a certain direction by means of a comparison with the direction vector from the starting point to the destination. This means that, just like in case of the underlying fundamental method, the stored angular values of the road element ends are used, however, in the advantageous development, an absolute value of the angular difference between the angle of the road element and that of the direction vector between starting point and destination is ascertained, and if a threshold value is exceeded, another penalty cost value is added to the respective maneuver. In this way, route variations leading away from the destination become more unlikely, resulting in that, in the route computation algorithm, the route tree does not circularly spread around the starting point, but rather more predominantly spreads in the direction of the destination. In case of bidirectional algorithms, i.e. that search a route both from the destination and from the starting point, the method is likewise applicable.

BRIEF DESCRIPTION OF THE SEVERAL VIEWS OF THE DRAWINGS

In the figures, various aspects of the present invention are schematically illustrated and will be described in an exemplary fashion below.

In these drawings:

FIG. 6 illustrates three roads with two road intersections and the road start angles and the road end angles in the area of the intersections.

DETAILED DESCRIPTION OF THE INVENTION

Figure 1:
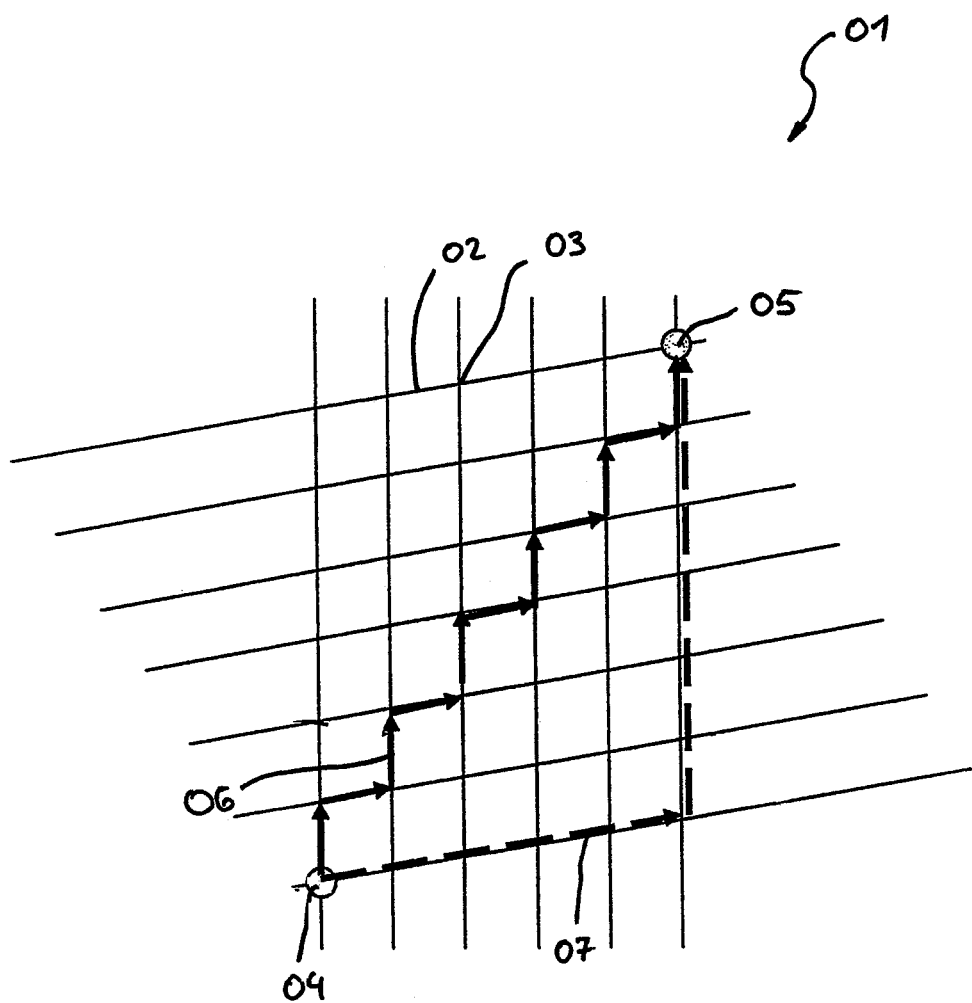
FIG. 1 shows a schematic illustration of a road network of nodes and road elements with two alternative routes from a starting point to a destination.

FIG. 1 schematically illustrates the Manhattan problem that results from a clear-cut checkered road network 01 that comprises approximately equi-long road elements 02 and interposed nodes 03. Cities featuring a corresponding road network can be found in particular in places where the road network has been created in strict compliance with urban planning regulations, as is common practice for instance in most cities of the U.S. If in such a road network a route from a starting point 04 to a destination 05 is computed, a zigzag-shaped route 06 may be the undesirable result, in which case a plurality of turning maneuvers are required. It is clearly apparent from FIG. 1 that in the second route 07 the same distance for reaching the destination 05 starting from starting point 04 needs to be traveled, wherein, however, merely one turning maneuver is required. It is thereby an objective of the present invention to enable a preferred computation of routes 07 in avoidance of a zigzag shaped course.

Figure 2:
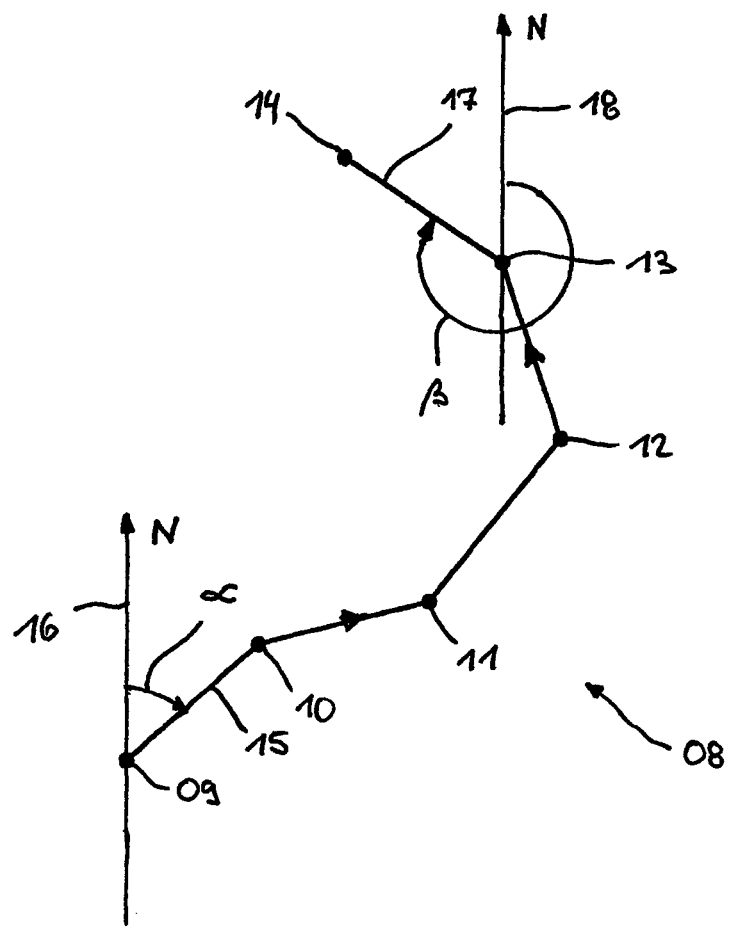
FIG. 2 illustrates a road element for specifying a road in a digital roadmap with several reference points and the road start angle and the road end angle.

FIG. 2 illustrates a road element 08 just like the one that is stored in a digital roadmap. The road element 08 is defined by the coordinates of the reference points 09 to 14, wherein the position of the reference points 09 to 14 approaches the course of the road to be depicted in the digital map. In order to be capable of performing the maneuver cost evaluation in the route computation in the simplest possible fashion, the road elements 08 are analyzed to the extent that a road start angle α and a road end angle β can be computed. The road start angle α thereby constitutes the angle that is enclosed between a road start vector 15 and a reference direction vector 16, wherein the orientation of the road start angle α is always indicated in a clockwise direction. The position of the road start vector 15 results from the course from the first reference point 09 to the second reference point 10. The reference direction vector 16 results from the northward direction and extends through the first reference point 09.

The road end angle β is enclosed by a road end vector 17 and a reference direction vector 18. The road end vector 17 extends from the penultimate reference point 13 to the ultimate reference point 14. The reference direction vector 18 is in turn directed in a northward direction and extends through the penultimate reference point 13.

Figure 3:
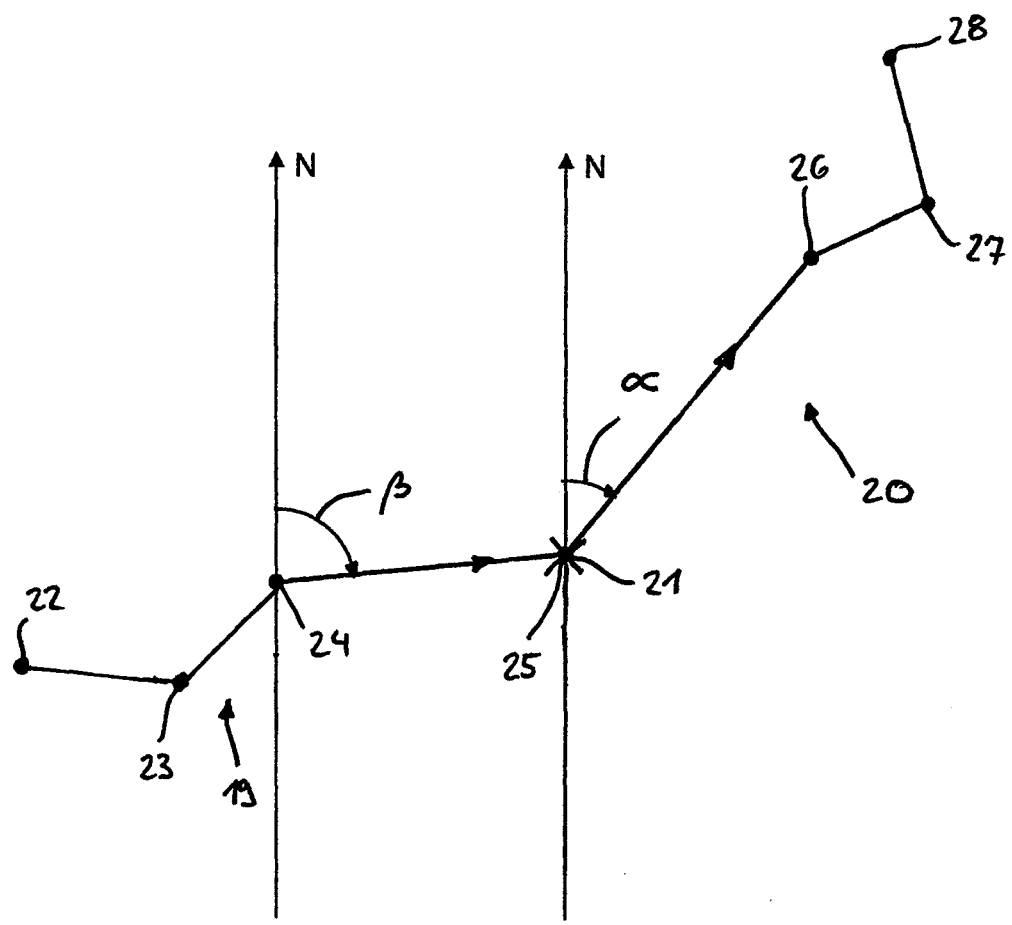
FIG. 3 illustrates a road element with the road start angle and the road end angle in a first direction of travel.

FIG. 3 illustrates the basic principle of the inventive method with the aid of two road elements 19 and 20 that converge into one another at an intersection point 21 and that are both only partly illustrated. The road element 19 is defined by reference points 22 to 25, whereas the road element 20 is defined by reference points 25 to 28.

FIG. 3 thereby illustrates the road end angle β of the road element 19 and the road start angle α of the road element 20, as is the result in case of a direction of travel in a westward direction.

In the evaluation of the turning maneuver at the intersection point 21, the angular difference between the road end angle β of the road element 19 preceding the intersection point 21 and the road start angle α of the road element 20 succeeding the intersection point 21 is defined. By defining said angular difference, it can subsequently be evaluated if a turning maneuver is required to be executed at the intersection point 21, and if so, the size of the turning angle is ascertained. In this way, maneuvers including a large number of and significant maneuver motions can be devaluated.

In conclusion, it is thusly possible to eliminate routes, such as route 06, with a clear-cut zigzag-shaped course, by means of simply evaluating the angular differences between the road start angle α and the road end angle β of the road elements that converge at an intersection point 21.

Figure 4:
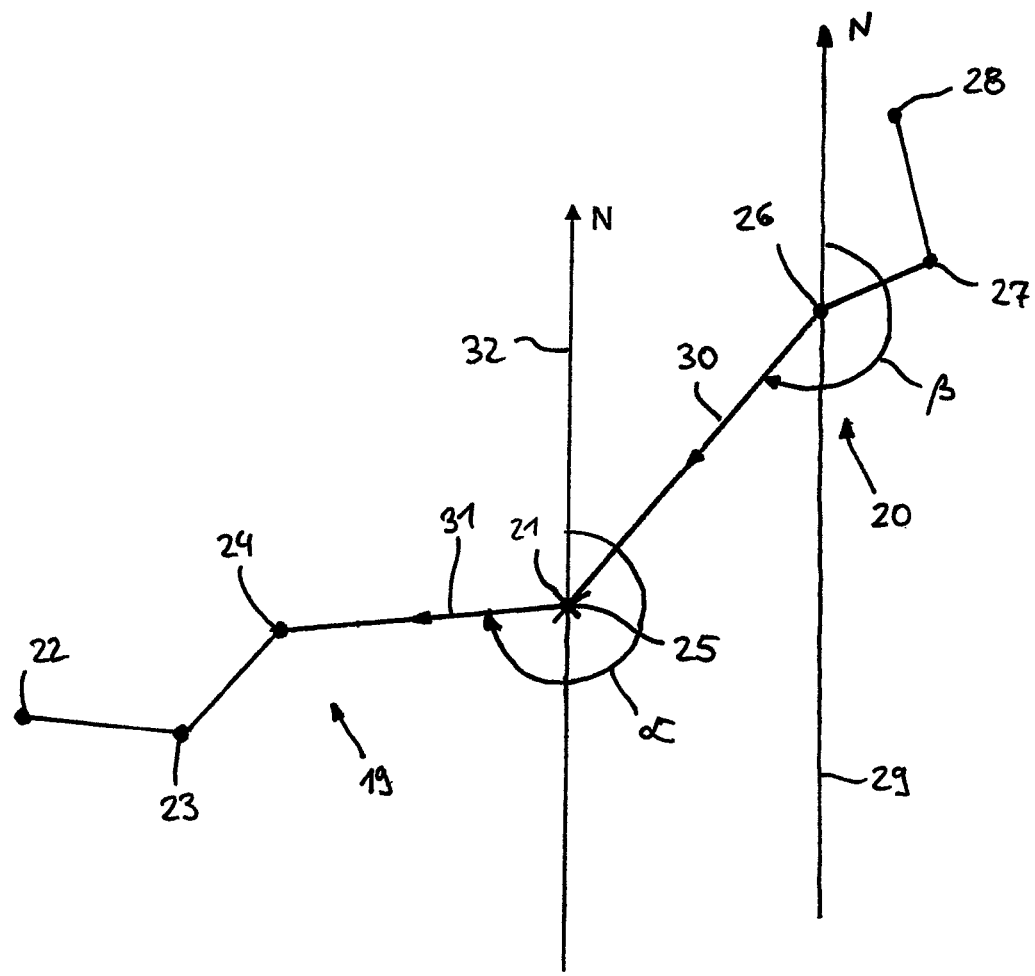
FIG. 4 illustrates the road element according to FIG. 3 with the road start angle and the road end angle in the opposite direction of travel.

FIG. 4 illustrates the road elements 19 and 20 with the interposed intersection point 25 in the opposite direction of travel. The road end angle β is here enclosed by the reference direction vector 29 and the road end vector 30 of the road element 20. The road start angle α of the road element 19 by contrast results from the course of the road start vector 31 and the reference direction vector 32.

Figure 5:
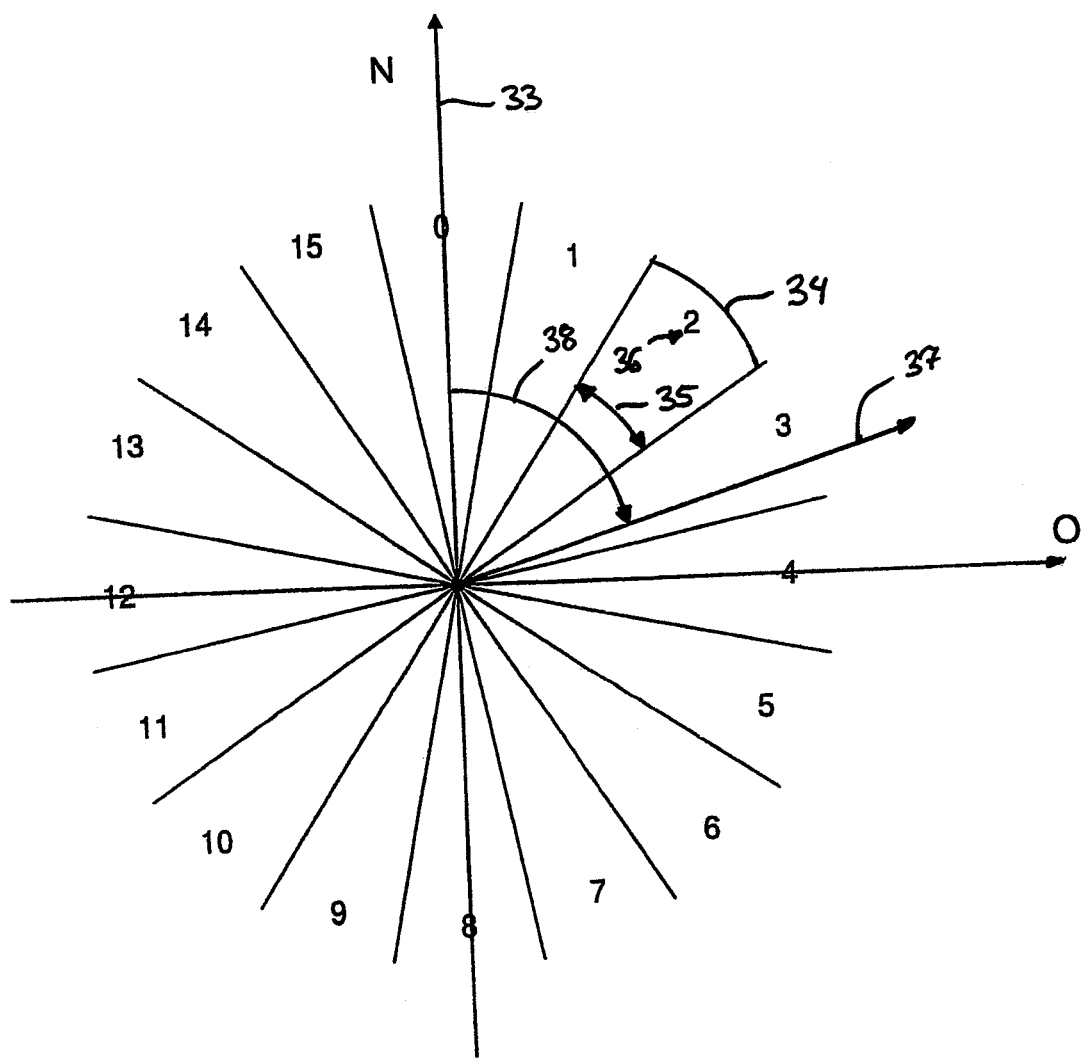
FIG. 5 illustrates a full circle composed of 16 sectors for classifying the road start angles and the road end angles with sectoral values.

FIG. 5 schematically illustrates an option for encoding the road start angle α and the road end angle β by means of angular values derived therefrom. Around the reference point of a reference direction vector 33 a full circle is divided into 16 equi-sized sectors 34, wherein each sector 34 sweeps an equi-sized sector division angle 35 of 22.5°. Each sector 34 is thereby assigned an unambiguous sectoral value 36 that is computed from the integer remainder of the result of dividing the respective angular range by the sector division angle. The numerical sectoral values 36 can hence be assigned to each road start angle α and to each road end angle β.

FIG. 5 exemplarily illustrates a road start vector 37 that extends in the third sector. From the road start angle 38, that in the illustrated example is approximately 60°, the sectoral value 3 can be unambiguously derived by means of the illustrated system so that in the database only the sectoral value 3 needs to be stored for storing the road network for representing the road start angle 38. In the light of the aspect that the sectoral value 3 is selected from a value range of 0 to 15, said sectoral value can be stored with a data size of 4 bit so that by means of the illustrated encoding, the storing of the road start angle and the road end angle for each road element is possible with one byte.

FIG. 6 schematically illustrates an intersection situation at a traffic circle 39, into which two entering roads 42 and 43 converge at two intersection points 40 and 41. At intersection points 40 and 41, the angular values derived from the road start angles and the road end angles, namely the sectoral values derived according to FIG. 5, are indicated.

If a route originating from the road element 39a and turning at the intersection point 41 into the entering road 43 is analyzed, the angular difference is computed by subtracting the angular value 7 by the angular value 3, wherein the resultant angular difference has the value of 4>0. Thus, it can be inferred from said result with respect to the angular difference that a right-hand curve is concerned.

If, vice versa, a left turn is executed from the entering road 43 into the section 39a of the traffic circle 39, an angular difference with the value of −4 (3−7) is the result such that said left-hand curve can be numerically computed.

In the illustrated example, an angular difference with the value of 0 corresponds to a turnaround maneuver by 180° and an angular difference of +−8 to a straight-ahead travel. Thereby, it is particularly advantageous, not only in case of a perfectly straight-ahead travel, to diagnose the same in this way, but also to interpret in the example an angular difference of +−7 as constituting a straight-ahead travel. Thereby, slight deviations in the road geometry that can also be the result of map inaccuracies are compensated. When approaching from a section 39b of the traffic circle 39 and intending to continue traveling into the section 39c of the traffic circle 39, a value of −8 (4−12) results as an angular difference so that from said result of the angular difference, it can be immediately inferred that a direct straight-ahead travel devoid of any turning maneuvers is concerned.

The invention claimed is:

1. A method for generating a digital roadmap that can be stored on an electronic storage medium and in which the road network of a geographical area is specified by a multitude of data sets, comprising the following method steps:

a) loading an original database, in which the road network of the geographical area is specified by a multitude of data sets, into an electronic analyzing device, wherein road data sets are contained in the original database, and wherein each road data set is representative of a road element as a sequence of n reference points, and wherein each road data set comprises at least two (n=2) reference points, b) selecting a road data set from the original database, c) determining a first road start angle (α) that is enclosed between a road start vector and a reference direction vector, wherein the road start vector extends between the first reference point of the road element and the second reference point of the road element or in the opposite direction, and wherein the reference direction vector extends through the first or the second reference point of the road element in a predetermined reference direction, d) determining a road end angle (β) that is enclosed between a road end vector and a reference direction vector, wherein the road end vector extends between the ultimate reference point of the road element and the penultimate reference point of the road element or in the opposite direction, and wherein the reference direction vector extends through the ultimate or the penultimate reference point of the road element in the predetermined reference direction, e) storing the road start angle (α) and the road end angle (β) or two angular values derived from the road start angle (α) and the road end angle (β) additionally to the road data set in a resultant database, f) repeating steps b) to e) for a multitude of road data sets;

wherein the orientation of the road start angle (α) and the road end angle (β) that is dependent on the direction of travel along a route is ascertained and stored in the resultant database; and wherein the orientation of the road start angle (α) and the road end angle (β) is uniformly ascertained in a clockwise direction or in an anti-clockwise direction.

2. A method for generating a digital roadmap that can be stored on an electronic storage medium and in which the road network of a geographical area is specified by a multitude of data sets, comprising the following method steps:

a) loading an original database, in which the road network of the geographical area is specified by a multitude of data sets, into an electronic analyzing device, wherein road data sets are contained in the original database, and wherein each road data set is representative of a road element as a sequence of n reference points, and wherein each road data set comprises at least two (n=2) reference points, b) selecting a road data set from the original database, c) determining a first road start angle (α) that is enclosed between a road start vector and a reference direction vector, wherein the road start vector extends between the first reference point of the road element and the second reference point of the road element or in the opposite direction, and wherein the reference direction vector extends through the first or the second reference point of the road element in a predetermined reference direction, d) determining a road end angle (β) that is enclosed between a road end vector and a reference direction vector, wherein the road end vector extends between the ultimate reference point of the road element and the penultimate reference point of the road element or in the opposite direction, and wherein the reference direction vector extends through the ultimate or the penultimate reference point of the road element in the predetermined reference direction, e) storing the road start angle (α) and the road end angle (β) or two angular values derived from the road start angle (α) and the road end angle (β) additionally to the road data set in a resultant database, f) repeating steps b) to e) for a multitude of road data sets;

wherein the angular values derived from the road start angle (α) and the road end angle (β) respectively exhibit a data size of 4 bit and jointly form one byte that is stored in the road data sets of the resultant database.

3. A method for generating a digital roadmap that can be stored on an electronic storage medium and in which the road network of a geographical area is specified by a multitude of data sets, comprising the following method steps:

a) loading an original database, in which the road network of the geographical area is specified by a multitude of data sets, into an electronic analyzing device, wherein road data sets are contained in the original database, and wherein each road data set is representative of a road element as a sequence of n reference points, and wherein each road data set comprises at least two (n=2) reference points, b) selecting a road data set from the original database, c) determining a first road start angle (α) that is enclosed between a road start vector and a reference direction vector, wherein the road start vector extends between the first reference point of the road element and the second reference point of the road element or in the opposite direction, and wherein the reference direction vector extends through the first or the second reference point of the road element in a predetermined reference direction, d) determining a road end angle (β) that is enclosed between a road end vector and a reference direction vector, wherein the road end vector extends between the ultimate reference point of the road element and the penultimate reference point of the road element or in the opposite direction, and wherein the reference direction vector extends through the ultimate or the penultimate reference point of the road element in the predetermined reference direction, e) storing the road start angle (α) and the road end angle (β) or two angular values derived from the road start angle (α) and the road end angle (β) additionally to the road data set in a resultant database, f) repeating steps b) to e) for a multitude of road data sets;

wherein, for computing the angular value derived from the road start angle (α) or the road end angle (β), a full circle is divided into several equi-sized sectors, wherein each sector is assigned a sectoral value that correlates with the sector division angle contained in the sector, and wherein the sectoral value of the sector containing the road start angle (α) or the road end angle (β) is respectively stored in the resultant database additionally to a road start angle (α) or a road end angle (β).

4. The method according to claim 3, wherein the sectors are divided by an equi-sized sector division angle of 22.5.degree.

5. The method according to claim 3, wherein the sectoral values are computed as an integer remainder of the result obtained by dividing the road start angle (α) or the road end angle (β) by a sector division angle.

6. A navigation system exhibiting a memory in which a digital roadmap for specifying the road network (01) in a geographical area is stored comprising at least one resultant database that has been created by using a method including the following method steps:

a) loading an original database, in which the road network of the geographical area is specified by a multitude of data sets, into an electronic analyzing device, wherein road data sets are contained in the original database, and wherein each road data set is representative of a road element as a sequence of n reference points, and wherein each road data set comprises at least two (n=2) reference points,
b) selecting a road data set from the original database,
c) determining a first road start angle ($\alpha$) that is enclosed between a road start vector and a reference direction vector, wherein the road start vector extends between the first reference point of the road element and the second reference point of the road element or in the opposite direction, and wherein the reference direction vector extends through the first or the second reference point of the road element in a predetermined reference direction,
d) determining a road end angle ($\beta$) that is enclosed between a road end vector and a reference direction vector, wherein the road end vector extends between the ultimate reference point of the road element and the penultimate reference point of the road element or in the opposite direction, and wherein the reference direction vector extends through the ultimate or the penultimate reference point of the road element in the predetermined reference direction,
e) storing the road start angle ($\alpha$) and the road end angle ($\beta$) or two angular values derived from the road start angle ($\alpha$) and the road end angle ($\beta$) additionally to the road data set in a resultant database,
f) repeating steps b) to e) for a multitude of road data sets; wherein the orientation of the road start angle ($\alpha$) and the road end angle ($\beta$) that is dependent on the direction of travel along a route is ascertained and stored in the resultant database; and
wherein the orientation of the road start angle ($\alpha$) and the road end angle ($\beta$) is uniformly ascertained in a clockwise direction or in an anti-clockwise direction.

7. A navigation system exhibiting a memory in which a digital roadmap for specifying the road network (01) in a geographical area is stored comprising at least one resultant database that has been created by using a method including the following method steps:
 a) loading an original database, in which the road network of the geographical area is specified by a multitude of data sets, into an electronic analyzing device, wherein road data sets are contained in the original database, and wherein each road data set is representative of a road element as a sequence of n reference points, and wherein each road data set comprises at least two (n=2) reference points,
 b) selecting a road data set from the original database,
 c) determining a first road start angle ($\alpha$) that is enclosed between a road start vector and a reference direction vector, wherein the road start vector extends between the first reference point of the road element and the second reference point of the road element or in the opposite direction, and wherein the reference direction vector extends through the first or the second reference point of the road element in a predetermined reference direction,
 d) determining a road end angle ($\beta$) that is enclosed between a road end vector and a reference direction vector, wherein the road end vector extends between the ultimate reference point of the road element and the penultimate reference point of the road element or in the opposite direction, and wherein the reference direction vector extends through the ultimate or the penultimate reference point of the road element in the predetermined reference direction,
 e) storing the road start angle ($\alpha$) and the road end angle ($\beta$) or two angular values derived from the road start angle ($\alpha$) and the road end angle ($\beta$) additionally to the road data set in a resultant database,
 f) repeating steps b) to e) for a multitude of road data sets; wherein the angular values derived from the road start angle ($\alpha$) and the road end angle ($\beta$) respectively exhibit a data size of 4 bit and jointly form one byte that is stored in the road data sets of the resultant database.

8. A navigation system exhibiting a memory in which a digital roadmap for specifying the road network (01) in a geographical area is stored comprising at least one resultant database that has been created by using a method including the following method steps:
 a) loading an original database, in which the road network of the geographical area is specified by a multitude of data sets, into an electronic analyzing device, wherein road data sets are contained in the original database, and wherein each road data set is representative of a road element as a sequence of n reference points, and wherein each road data set comprises at least two (n=2) reference points,
 b) selecting a road data set from the original database,
 c) determining a first road start angle ($\alpha$) that is enclosed between a road start vector and a reference direction vector, wherein the road start vector extends between the first reference point of the road element and the second reference point of the road element or in the opposite direction, and wherein the reference direction vector extends through the first or the second reference point of the road element in a predetermined reference direction,
 d) determining a road end angle ($\beta$) that is enclosed between a road end vector and a reference direction vector, wherein the road end vector extends between the ultimate reference point of the road element and the penultimate reference point of the road element or in the opposite direction, and wherein the reference direction vector extends through the ultimate or the penultimate reference point of the road element in the predetermined reference direction,
 e) storing the road start angle ($\alpha$) and the road end angle ($\beta$) or two angular values derived from the road start angle ($\alpha$) and the road end angle ($\beta$) additionally to the road data set in a resultant database,
 f) repeating steps b) to e) for a multitude of road data sets; wherein, for computing the angular value derived from the road start angle ($\alpha$) or the road end angle ($\beta$), a full circle is divided into several equi-sized sectors, wherein each sector is assigned a sectoral value that correlates with the sector division angle contained in the sector, and wherein the sectoral value of the sector containing the road start angle ($\alpha$) or the road end angle ($\beta$) is respectively stored in the resultant database additionally to a road start angle ($\alpha$) or a road end angle ($\beta$).

9. The navigation system according to claim 8, wherein the sectors are divided by an equi-sized sector division angle of 22.5.degree.

10. The navigation system according to claim 8, wherein the sectoral values are computed as an integer remainder of the result obtained by dividing the road start angle ($\alpha$) or the road end angle ($\beta$) by a sector division angle.

11. A navigation system exhibiting a memory in which a digital roadmap for specifying the road network (01) in a geographical area is stored comprising at least one resultant database that has been created by using a method including the following method steps:
 a) loading an original database, in which the road network of the geographical area is specified by a multitude of data sets, into an electronic analyzing device, wherein road data sets are contained in the original database, and wherein each road data set is representative of a road element as a sequence of n reference points, and wherein each road data set comprises at least two (n=2) reference points, b) selecting a road data set from the original database, c) determining a first road start angle ($\alpha$) that is enclosed between a road start vector and a reference direction vector, wherein the road start vector extends between the first reference point of the road element and the second reference point of the road element or in the opposite direction, and wherein the reference direction vector extends through the first or the second reference point of the road element in a predetermined reference direction, d) determining a road end angle ($\beta$) that is enclosed between a road end vector and a reference direction vector, wherein the road end vector extends between the ultimate reference point of the road element and the penultimate reference point of the road element or in the opposite direction, and wherein the reference direction vector extends through the ultimate or the penultimate reference point of the road element in the predetermined reference direction, e) storing the road start angle ($\alpha$) and the road end angle ($\beta$) or two angular values derived from the road start angle ($\alpha$) and the road end angle ($\beta$) additionally to the road data set in a resultant database, f) repeating steps b) to e) for a multitude of road data sets; wherein the route is composed of a sequence of road elements and nodes disposed between the road elements that, by means of a route computation unit using a route computation method, are selected from a database, in which a road network is specified by a network of nodes and road elements linking the nodes, wherein, in the route computation, in case of maneuvers at intersection points between at least two road elements a maneuver evaluation is performed and, to this end, a maneuver cost value is computed in the route computation unit, wherein a) for the maneuver cost evaluation, the road end angle ($\beta$) or the angular value derived therefrom for the road element preceding the intersection points and the road start angle ($\alpha$) or the angular value derived therefrom for the road element succeeding the intersection points are read out from a database and are loaded into the route computation unit, b) computing an angular differential value between the road start angle ($\alpha$) and the road end angle ($\beta$) or computing an angular differential value between the two angular values derived from the road start angle and the road end angle, c) computing the maneuver cost value as a function of the angular differential value.

12. The method according to claim 11, wherein, in computing the maneuver cost value, the angular differential value is compared with at least one predefined angular differential threshold value, wherein the maneuver cost value is increased if the angular differential value exceeds the angular differential threshold value, and wherein the maneuver cost value remains unchanged if the angular differential value lies below the angular differential threshold value.

13. The method according to claim 11, wherein the road classes of the road elements that converge at an intersection point are ascertained, wherein the maneuver cost evaluation is terminated as a function of the angular differential value if at least one thusly ascertained road class exceeds or lies below a predefined road class threshold value.

14. The method according to claim 11, wherein the number of the road elements that converge at an intersection point is computed and the maneuver cost evaluation is terminated as a function of the angular differential value if precisely two road elements converge at the intersection point.

15. The method according to claim 11, wherein the turning direction of the maneuver executed at the intersection point is derived from the angular differential value, wherein the maneuver cost evaluation is computed as a function of the turning direction.

16. The method according to claim 11, wherein an angle-based right-of-way situation is derived from the angular differential value and at least one supplementary attribute of the road element, wherein the maneuver cost evaluation is computed as a function of the angle-based right-of-way situation.

17. The method according to claim 11, wherein, in computing the maneuver cost value, the road start angle of a road element, in particular the road start angle of the destination road, is compared with the direction vector that extends from the starting point to the destination or vice versa, wherein the maneuver cost value is increased for the respective maneuver if a threshold value is exceeded.

* * * * *